United States Patent [19]

Lemelson

[11] Patent Number: 4,681,412
[45] Date of Patent: Jul. 21, 1987

[54] CONTACT LENS CONTAINING LIGHT SENSITIVE MATERIAL

[76] Inventor: Jerome H. Lemelson, 85 Rector St., Metuchen, N.J. 08840

[21] Appl. No.: 656,313

[22] Filed: Oct. 1, 1984

[51] Int. Cl.$^4$ .......................... G02C 7/04; G02C 7/10
[52] U.S. Cl. ................................................. 351/162
[58] Field of Search ............... 351/160 H, 160 R, 161, 351/162

[56] References Cited

U.S. PATENT DOCUMENTS

| | | | |
|---|---|---|---|
| 3,507,552 | 4/1970 | Scott | 351/162 |
| 3,679,504 | 7/1972 | Wichterle | 351/162 |
| 3,973,837 | 8/1976 | Page | 351/160 H |
| 4,435,050 | 3/1984 | Poler | 351/160 R |

FOREIGN PATENT DOCUMENTS 2436516 7/1975 Fed. Rep. of Germany ...... 351/162

Primary Examiner—John K. Corbin
Assistant Examiner—Scott J. Sugarman

[57] ABSTRACT

A contact lens having a unitary molded central portion containing a light sensitive material which varies in light transmission with variations in the intensity of ambient light. One embodiment has an assembly of components secured to the lens by molding. The assembly also contains a light sensitive material.

7 Claims, 7 Drawing Figures

CONTACT LENS CONTAINING LIGHT SENSITIVE MATERIAL

BACKGROUND OF THE INVENTION

1. Field of the Invention

This invention relates to improvements in contact lenses for use against the eye to correct defective vision. In particular, the invention concerns improvements in the struture of such lenses which render them capable of filtering or blocking bright light to the eye of the wearer, wherein such blocking characteristic varies with the amount of ambient light entering the lens by means of photosentive material forming part of the lens and exhibiting alterable anistropic or photochromic effects.

2. Description of the Prior Art

The prior art comprises soft and hard contact lenses made of plastic resins and glass lenses for eye glasses which contain photochromic chemicals.

SUMMARY OF THE INVENTION

This invention relates to new and improved structures in corrective optical lenses for use against the eyes of persons and in particular to such lenses which contain one or more chemicals for filtering or blocking bright light such as sunlight. In a preferred form of the invention, one or more photosensitive materials are employed within or coated against the outside surface of a central circular portion of a contact lens which material increases in its ability to absorb or block light, such as sunlight or other bright light, as or soon after such bright light enters the central portion of the lens, thereby protecting the eyes of the lens wearer from such bright light. The central portion of the contact lens which contains such photosensitive material is preferably circular in shape and about the size of the cornea of the eye of the user in order to block or filter all bright light entering the eye and for appearance or cosmetic purposes whereby the contact lens remains relatively undiscernable to persons looking at the eyes of the person wearing such lenses from a distance or of such a characteristic as to not cause the persons eyes to be degraded or outstanding in appearance. Such central portion of the contact lens may also be decorated by printing or other means to represent the cornea of the eye and to thereby improve the appearance of the person wearing such lenses.

One or more of the following structures is employed to provide eye contact lenses which protect the eyes of the wearer against bright and unwanted light:

a. A photosensitive material, such as a photochromic or photo-anistropic effect producing chemical or chemicals, is disposed within a light transmitting or normally transparent resin, such as any of the known polymers, copolymers of multi-polymer resins employed to make contact lenses per se, wherein the polymer, depending on the portion of the lens it is used to form, may or may not be rendered retentive of liquid such as eye fluid to lubricatethe surface of the eye. Such combined light sensitive chemical and polymer mixture is applied as a coating to a portion of a thin contact lens of conventional and required lens shape, preferably a circular area of the central portion of the lens which becomes aligned with the cornea of the eye and preferably about the shape and area of the cornea seen from the exterior of the eye or the diameter of the pupil or between the cornea and pupil.

b. The photosensitive chemical containing resin of (a), or a modification thereof is formed into a thin circular molding or casting, machining or other means, which disc is smaller and thinner than the thickness of the contact lens and is adhesively bonded or heat sealed to the ourside surface of the central portion of the contact lens.

c. The photosensitive chemical containing resin of (a) is molded in situ as a thin,circular concave . layer against the central portion of the contact lens,preferably by flowing such resin in a liquid or molten state into a cavity of an open mold section , the periphery of which mold is pressed against the contact lens base which is disposed against a support or the surface of a die or mold cavity in which it is formed.

d. The contact lense is formed by so called two shot molding in whicn either the transparent plastic lens base or a thin circularly shaped photosensitive portion of the lens is first formed by injection molding in a mold and retained in one of the mold sections while the mold is opened and a second mold section containing a larger cavity is closed with such lens component containing section and a plastic resin injected into the resulting cavity to form it to shape against the first formed lens section.

e. The photosensitive chemical containing resin may be formed into a thin lens approximately the contour of the cornea of the eye of tne lens wearer and the thickness of the central portion of the contact lens, by molding, casting or cutting from, a blank of such material. An annular portion of the contact lens may be similarly formed to shape with an opening approximately the outside diameter of such small disc or slightly smaller in diameter. Both components are then assembled, one inside the other and bonded together with an adhesive, compressed and heat sealed or otherwise assembled to form the complete lens.

f. Any of the described structures may be supplemented by coating the photosensitive resin component or coating with a transparent plastic protective resinous material or by disposing a thin film of Plastic sheeting against the photosensitive material and, in certain instances , also against adjacent material of the remaining portion of the lens and solvent or resin bonding or heat sealing such thin film to either or both components of the lens.

g. Photosensitive material of the type described for use in blocking or filtering bright light, may be disposed in suitable glass which is formed into a thin,flexible concave disc, having the diameter and shape of the cornea of the eye. Such glass disc is sealed between two transparent portion of the contact lens, one a base portion defining the major portion of the lens and the other a circular dome shaped portion larger than the disc of photochromic or photo-anistropic glass. Sealing is effected by molding, resin bonding or heat sealing the two lens components together at the periphery of the resin disc portion of the lens. Such heat sealing or bonding may also be effected between the glass disc and either or both plastic resin portion of the lens which sandwich the glass disc therebetween.

Accordingly it is a primary object of this invention to provide a new and improved structure in a lens for use against the eye.

Another object is to provide a contact lens having means for protecting the eyes of the user against excessioe bright light, such as sunlight, glare and the like.

Another object is to provide a contact lens with an eye protecting portion thereof for filtering light and preventing excessive light from entering the eye through the cornea of the eye.

Another object is to provide a contact lens, a portion of which is approximately the contour of the cornea of the eye and is located ro become aligned with the cornea of the eye of a wearer when the lens is properly disposed against the eye wherein such shaped portion contains a chemical or chemicals which operate to protect the eye from excessive or bright light.

Another object is to provide a contact lens with a portion thereof which is shaped and decorated to represent the cornea and which contains a photosensitive chemical for protecting the eye against bright light.

Another object is provide a contact lens for use against the eye and containing a circular disc shaped portion containing a photochromic chemical which varies in its ability to absorb light for protecting the eye of the wearer.

Another object is to provide a contact lens formed of a plastic resin and having a component thereof sealed between layers of such plastic, which component contains a photosensitive material, such as a photochromic chemical operable to increase in its ability to block light from the iris or cornea of the eye of tne wearer as the intensity of light passing through such component.

With the above and such other objects in view as may here inafter more fully appear, the invention consists of the novel constructions, combinations and arrangements of parts as will be more fully described and illustrated in the accompanying drawings but it is to be understood that changes, variations and modifications may be resorted to which fall within the scope of the invention as claimed.

BRIEF DESCRIPTION OF THE DRAWINGS

In FIG. 1 is shown a contact lens 10 for eye to correct vision defects . The lens 10 has a main body portion 11 having a substantially circular periphery 12 with a thin edge .Circular shaped body portion 11 has its rear surface 13 either shaped to conform to the shape of the front of the eye of the wearer or is so constructed and shaped that such rear surface will easily effect such conformance when the lens is disposed against the eye and adhesion or surface tension between the two retains the lens in such conformance. The central portion 14 of the lens body 11 is either formed of or contains a circular portion 15 made of the same resin forming the body portion 11 and containing one or more light sensitive or photosensitive chemicals bonded to such central portion. The photosensitive chemical containing said circular portion 15 may comprise a plastic molding, a machined or turned concave.disc-like member of such photosensitive chemical containing resin, a die cut portion of plastic film containing or coated with such photosensitive plastic or chemical or a small thin lens. of glass, such as photochromic glass sealed between layers of transparent plastic resin. Thus the lens shaped portion 15 may comprise all or a portion of the central portion of the contact lens 10. The circular shape of portion 15 is preferably about the same shape of or a little larger than the pupil of the eye of the wearer so that all light passing through the cornea and pupil will pass through such photosensitive chemical containing portion 15.

In FIG. 2 is shown a second embodiment of the invention constructed in accordance with details described above or hereafter but having a photosensitive containing chemical portion which is larger in diameter than portion 15 of FIG. 1. The lens 20 is formed of a lens body portion 21, similar to portion 11 of FIG. 1 and made of a suitable synthetic polymer, copolymer or multiple polymer of any of the types used to form contact lenses, which polymer or copolymer may be flexible, semiflexible or rigid to form a flexible or so called hard lens base and may be capable of absorbing liquid such as eye fluid or incapable of such absorption. The main body portion 21 has a circular periphery 22 and a central portion 24 containing a circular portion or member 25 forming part of the lens body or attached thereto as described. and located at the center or central portion of the lens.The primary difference between the lens structuresof FIG. 2 and FIG. 1 is that the disc shaped portion 25 of FIG. 2 is larger in diameter than the disc shaped portion 15 of FIG. 1 and preferably conforms to the face or contour of the cornea or iris of the eye of the user.As such, when circular portion 25 darkens with increased ambient light, such as sunlight, the appearance of the eye will be somewhat similar similar to the natural eye in configuration, if not color.

In FIG. 3, a circular shaped contact lens 30 is formed as described, with a thin lens body portion 31 formed of a suitable polymer or copolymer which is substantially clear and light transmitting and is molded or machined to a desired circular shape with a circular periphery 31 a little greater than the diameter of the cornea of the eye of the wearer. The central circular portion 34 of the lens 30 or a portion thereof as described may contain the described photosensitive or photochromic chemical or contain a capping member containing such chemical for preventing bright light from passing through the pupil or lens of the wearer. Covering such central portion 34 is a coating or film 35 of circular shape which coating is decorated with a central circular portion 36 representing the pupil of the eye of the wearer and an annular portion 37 surrounding central portion 36 which is descorated to represent the iris of the eye of the user. Circular portion 35 may comprise a die-cut disc of thin plastic film which has been printed or has photographically developed therein indicia representing the pupil and iris of an eye. While the image defining the iris (e.g. notation 37) may be printed of opaque material or photographically developed opaque to light, the indicia 36 representing the pupil is necessarily light transmitting. In a preferred form, circular area 36 is formed about the diameter of the pupil of the eye of the wearer and is a clear plastic resin and/or glass disc containing the described photosensitive chemical designed to block light from passing through the pupil and lens of the eye or reduce the intensity of bright light passing therethrough.

Figure 4:
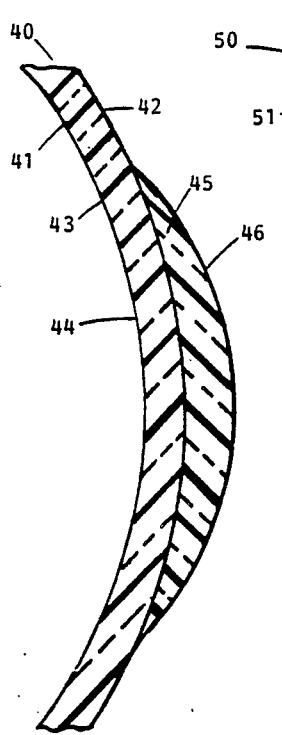
FIG. 4 is a partial side view in cross section of a contact lens formed of two components, a lens base and a central lens portion containing a photosensitive material and molded or bonded to the central portion of the base.

FIG. 4 shows details of one of the described contact lens constructions employing a lamination or sandwich molding construction. The thin contact lens 40 has a main body portion 41 made of a suitable flexible or rigid polymer or copolymer. If flexible, such polymer is clear and capable of absorbing and retaining a substantial amount of liquid such as eye tear fluid to properly lublicate it and maintain it by adhesion against the cornea of the eye by contact of the suitably concavely shaped rear surface 43 thereof. Laminated by sealing, adhesive, solvent or molding, to the front face 42 of lens portion 41 and centrally disposed thereagainst is a circular lens component 45 which may be made of the same resin as that forming component 41, a different flexible or rigid polymer or copolymer or glass Contained within or coated on the front face 46 of component 45 is the described photosensitive chemical.

Figure 5:
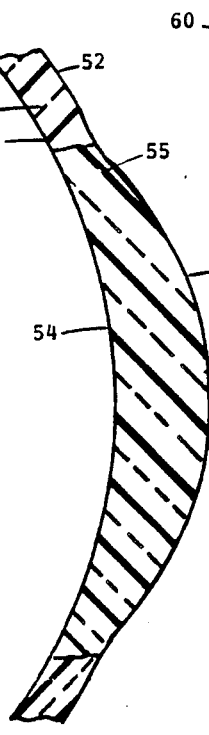
FIG. 5 is a side view of part of a contact lens in cross section having a central portion of the lens molded or otherwise formed of a plastic resin containing a photochromic chemical.

In FIG. 5 is shown a contact lens 50 made of flexible or rigid resin as described and having an outer portion 51 of annular shape and a central circular portion 56 which is dispoed within the annular portion 51 by molding either of the two components 51 and 56 one inside the other or molding or otherwise forming both separate from each other and sealing or bonding the two lens members together at their contacting peripheries or in peripheral overlapping relationship. The rear face 53 of portion 51 is preferably a smooth concave extension of the rear face 54 of central portion 56 and both conform to the eye of the wearer when the lens 50 is worn against the eye. The outer surface 57 of central portion 56 may be decorated as in FIG. 3 with transparent ink or a photographic transparent image of the eye formed in a photoplastic coating thereon or in photoplastic chemical(s) in the resin forming section 56. The central circular portion 56 may be made of a rigid or flexible hydrophyllic resin or copolymer as described and may contain and may contain one or more of the described photosensitive resins. The outer convex surface 57 of central portion 56 may be coated with a transparent polymer or copolymer of one of the types described containing such a photosensitive resin or have a transparent clear plastic film or sheet die cut to the contour of central portion 56 and laminated or bonded to surface 57. Surface 57 may be about or a little larger frontal diameter of the cornea of the eye of the wearer.

Figure 6:
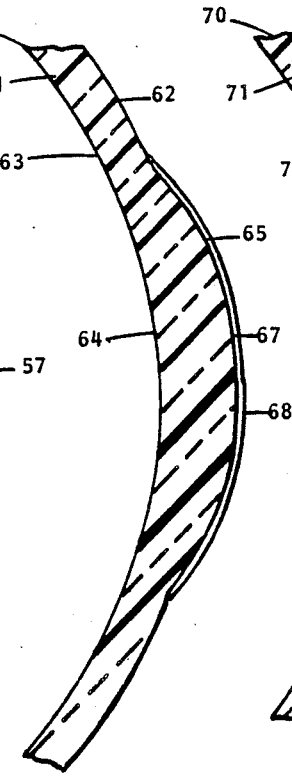
FIG. 6 is a side view in cross section of part of a contact lens molded of a plastic resin.and having a coating or film containing a photosensitive chemical bonded to the central portion of the lens.

Illustrated in FIG. 6 is a contact lens 60 formed of s single molding 61 of suitable rigid or flexible polymer or copolymer with or without its ability to absorb and retain water (e.g. hydrophyllic). The rear surface 63 of the lens molding 61 is shaped to conform to the eye and the central portion 64 thereof has a convex exterior surface 65 providing the necessary vision correction for the wearer. Bonded or laminated to such outer surface 65 is a thin film 68 of flexible or rigid clear plastic resin which substantially conforms to the diameter of central portion 64 which conforms to the diameter of the cornea or is a little larger or smaller. The outer surface 68 of film 67 may be printed with transparent ink or inks and decorated as in FIG. 3 to represent the iris and pupil of the eye. Either film 67 and/or the central portion 64 of the molding 61 may contain a photosensitive chemical of the type described to change color and block bright light or reduce the intensity or amount of light entering the eye through the pupil and lens of the eye. Circular section of film 67 may also be bonded or welded to the central sections of the lenses of FIGS. 4 and 5 as well as FIG. 7 to be described.

Figure 7:
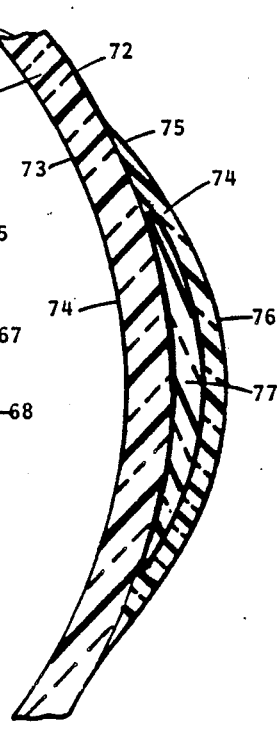
FIG. 7 is a side view in cross section of part of a contact lens formed of several components or more including a circular, disc-lie plastic or glass lens containg a phorosensitive chemical and sealed between a main lens component and a cover therefore.

The contact lens 70 illustrated in FIG. 7 is made of at least three components, a main lens component 71 with a rear surface/covering the entire surface of the cornea of the eye .Surface 73 may also contact a peripheral portion of the eye beyond the cornea. An outer lens portion 76 is separately molded from main lens portion 71 and is peripherally welded or bonded to the central portion 74 of component 71 providing a cavity 77 therebetween. Filling such cavity 77 is a small circular convexly shaped lens member 78 containing the described photosensitive chemical for blocking bright light when it automatically changes in its light absorbing characteristics in response to such bright light.Lens member 78 may be made or a flexible or rigid polymer or copolymer or glass containing a photosensitive chemical such as a photochromic chemical. Notation 75 refers to a circumscribing seal provided by bonding,heat sealing or welding around the periphery of lens member 78 and the periphery of the central portion 74 of lens member 71.

Various synthetic polymers and copolymers may be employed to fabricate the described contact lens components to form lenses which are either rigid or flexible in struture or of a structure which employs both rigid and flexible components.For example, while the lens body portions 21,31,41,51,61 and 71 may be formed of so called flexible and hydrophylic polymers and copolymers, the photosensitive chemical containing components of such lenses may be for formed of either more rigid polymers or copolymers or flexible polymers or copolymers which are not hydrophylic,particularly if they do not contact the eye during use or only contact a portion of the eye.

Hydrophylic resins which may be employed include copolymers of such resins as an alkyl and a methacrylate; an ester of acrylic or methacrylic acid and a suitable hydrophylic monomer; a hydroxyalkyl acrylate and alkalene glycol diacrylate or methacrylate; polysiloxcinylalkyl acrylic ester and alkyl acrylic ester,etc. U.S. Patents describing such contact lens materials include U.S. Pat. Nos. 4,452,925; 4,463,148; 4,465,795; 4,465;794; 4,451,629; 4,450,262; 4,440,918; 4,436,887; 4,433,111; 4,423,930 and U.S. Pat. No. Re. 31,406.

Photosensitive chemicals which may be incorporated into polymers such as cured cellulose esters, silicone resins, clear polyurethane resins or suitable copolymers such as described above and defined in such listed patents may comprise such photoshromic chemicals as silver chloride and/or silver bromide crystals together with suitable alkali metal oxides which render the resin or glass component of the lens optically anistropic by darkening same when irradiated with actinic radiation wherein the polymer or glass will become optically isotropic when it returns to its. clear state upon removal of the darkening radiation.Such silver halide crystals throughout the resin or glass component of the lens which is photosensitive (e.g. components such as denoted 15,25,35, 36,46,56,67 and 77) with or without the addition of suitable colorants employed in up to a few per cent by weight to effect coloring of the portions of the lens simulating or aligned with the lens and pupil of the eye as described.

Patents which describe various photosensitive materials such as photochromic chemicals used in rendering glass which is darkenable with light and which lightens when such light diminishes or is removed, include U.S. Pat. Nos. 4,057,408; 4,108,674;4,125,404; 4,154,590; 4,160,655; 4,160,654; 4,190,451; 4,191,547; 4,240,836; 4,349,634; 3,208,860; 3,540,793 and 3,954,485. Certain of these glasses contain parallel elongated crystals.of silver halide or other halides such as copper cadmium halides which exhibit reversible photochromic and dichromic behavior and which/may be employed in the lens components described herein by incorporating same into suitable rigid or flexible polymers,copolymers or glasses used for such components.Suitable monoploymer and hard contact lens materials which may be employed to receive and utilize such photochromic chemicals or crystals are described in such U.S Pat. Nos. 4,433,125 4,395,496; 4,303,772 and 4,424,328.

Figure 1:
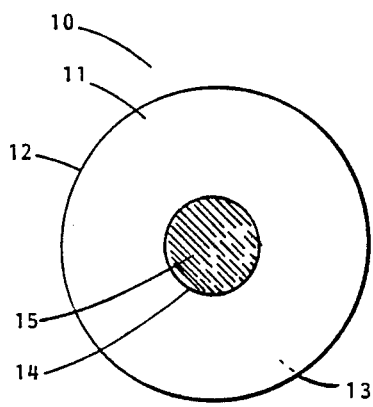
FIG. 1 is a front view of one form of contact lens for use against the eye having a central portion about or a little larger than the diameter of the pupil of the eye and containing, coated or covered with a transparent resin, ceramic or glass containing a photosensitive chemical which reduces its ability to pass light to the eye as the intensity of light directed thereagainst increases.
Figure 2:
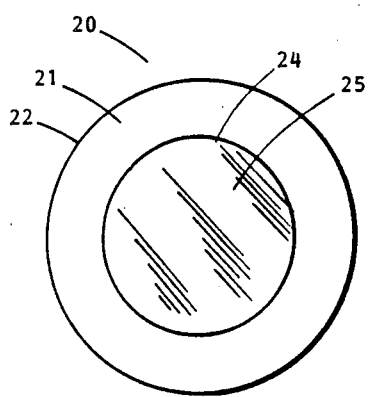
FIG. 2 is a front view of a contact lens having a central portion thereof having a diameter about the size of the cornea of the eye of the user and containing a photosensitive material such as a photochromic chemical.
Figure 3:
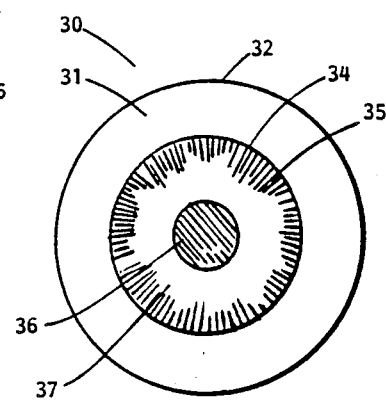
FIG. 3 is a front view of a contact lens having a central pupil of the eye of the wearer wherein either the pupil simulating portion or both the simualted pupil and iris portions of the eye contain or include portions of the lens containing a photo-sensitive chemical such as a photochromic chemical.

Certain modifications to the described embodiments of the invention may be made without departing from the invention.For example, any of the lens structures illustrated in FIGS. 1 to 7 may employ the photosenstive or photochromic chemical in a polymer or copolymer which is either hydrophyllic or hydrophobic depending on its size,location and if the major portion of the lens is made of a rigid or flexible polymer or copolymer. Such photosensitive material or resin containing same may be printed on the outside surface of the central portion of the lens, may be disposed within the lens itself as in FIG. 7 or otherwise, may form part of the molding defining the lens body, such as by double shot molding or controlled flow molding of both the clear resin which does not contain the photosensitive chemical and the resin containing same. The photosensitive resin may also be separately molded into a lens component or lens portion of the contact lens or a thin concave shell, as in FIG. 6, which is assembled with and bonded to the outer surface of the central portion of the contact lens.All of such embodiments may contain indicia printed on the outside surface thereof, such as shown in FIG.3 , representing the iris and pupil of the eye. Such printing may be replaced by indicia which is formed photographically in a photoplastic resin containing photographic chemicals therein.

While the main body of the contact lens, such as component 11,21,31,41,51,61, and 71 of the various embodiments shown in the drawings, is preferably a hydrophylic copolymer capable of retaining a substantial amount of lubricating fluid,if flexible,or a highly smooth surface forming polymer, if rigid, the other component or components of the lens may comprise a different polymer exhibiting the same or different physical characteristics as that of the ,ain body. For example, components 15,15,35,46,67 and 77 may be made of a rigid, non-porous or hydrophobic polymer or copolymer while the main body may be formed of a hydrophilic copolymer.

I claim:

1. A protective and corrective eye lens for use against the eye of a person comprising:
    (a) a contact lens base defining a unitary molding of substantially circular configuration formed of a clear plastic resin and having a rear surface which is configured and adapted to be disposed in conformance with the central portion of the front of the eye of a person wearing said contact lens,
    (b) said contact lens having a circular central portion forming a part of said unitary molding with said lens base, which central portion is operable to receive and transmit therethrough ambient light directed at a person wearing said lens, said central portion of said lens being located so as to pass the light it receives through the cornea and pupil of the eye to the lens of the eye when said contact lens is operatively disposed against the eye of said person,
    (c) said contact lens including said circular central portion thereof being shaped to correct aberrations in the vision of the person wearing said lens,
    (d) said circular central portion of said lens containing a light sensitive material in composition with said clear plastic resin, which light sensitive material is operable to change in its light transmissivity when subjected to ambient light such as sunlight passed through said lens when said lens is operatively worn by a person, whereby the amount of light passing through said central portion of said lens into the eye of the wearer of said lens will be less than the light received by said central portion of said lens.

2. A protective and corrective contact eye lens in accordance with claim 1 wherein said light sensitive material in composition with said clear plastic resin is a photochromic chemical.

3. A protective and corrective contact eye lens in accordance with claim 2 wherein said light sensitive material comprises crystals of photochromic chemical supported within and dispersed throughout the plastic resin forming said circular central portion of said lens.

4. A protective and corrective contact eye lens in accordance with claim 1 wherein said circular central portion of said lens is of greater thickness than the anular portion thereof defined by the periphery of said lens base.

5. A protective and corrective eye lens for use in contact with the eye of a person comprising:
    (a) a contact lens base formed of a flexible, transparent and substantially clear plastic resin and having a rear surface which is configured and adapted to be disposed in conformance with the central portion of the front of the eye of a person wearing the lens of which said lens base forms a part,
    (b) said contact lens having an annular peripheral portion surrounding and supporting a central portion, which central portion is disposed and operable to receive ambient light, such as sunlight, and to pass said light through the cornea and pupil of the eye to the lens of the eye, (c) said central portion of said contact lens containing a light sensitive material encapsulated therein, which light sensitive material changes in its light transmissivity when subjected to ambient light passed to said lens when it is worn by a person, whereby the amount of light passing through said lens to the eye will be less than the light received by the lens, and (d) said central portion of said contact lens being integrally formed with and defining an inward extension of said annular peripheral portion of said lens and peripherally joined thereto by molding.

6. A contact lens for use in contact with the eye of a person comprising:
   (a) a first lens component having a substantially circular configuration and made of a substantially clear, light transmitting plastic polymer,
   (b) said first lens component having a diameter which is greater than the diameter of the cornea of the eye of a person wearing said contact lens,
   (c) a second lens component having a circular shape and a smaller diameter than the diameter of said first lens component,
   (d) the periphery of said second lens component being secured along its border portion to the outer surface of said first lens component and being shaped to dispose the central inside surface portion thereof away from the outer surface of said first lens component,
   (e) a third lens component comprising a thin, circularly shaped solid light transmitting solid member which is smaller in diameter than the diameter of said first and second lens components and is assembled therebetween,
   (f) said third lens component containing a photosensitive chemical disposed therein which changes in its light transmissivity when subjected to ambient light passed through said lens,
   (g) said third lens component substantially filling the volume between said first and second lens components and defining an internal support for said first and second lens components therebetween.

7. A contact lens in accordance with claim 6 wherein said third lens component is formed of photochromic glass which is sealed between said first and second lens components.

* * * * *